F. W. LOGSDON.
SPREAD ROLLER.
APPLICATION FILED JUNE 26, 1916.
1,212,520.
Patented Jan. 16, 1917.
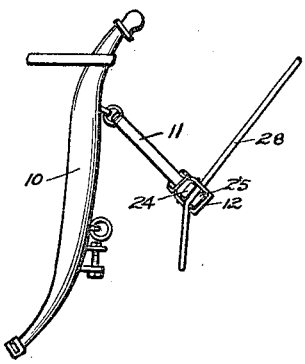
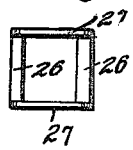
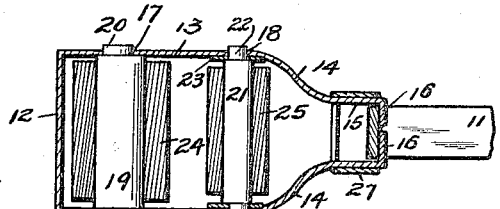
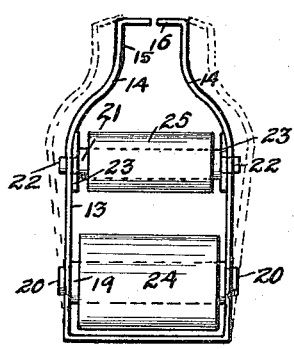
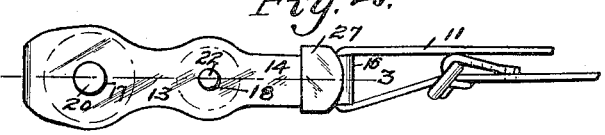
Witness
Will Freeman
Inventor
F. W. Logsdon
By Orwig & Bain
Attorneys.

UNITED STATES PATENT OFFICE.

FRANK W. LOGSDON, OF COLFAX, IOWA.

SPREAD-ROLLER.

1,212,520.  Specification of Letters Patent.  Patented Jan. 16, 1917.

Application filed June 26, 1916. Serial No. 105,861.

*To all whom it may concern:*

Be it known that I, FRANK W. LOGSDON, a citizen of the United States, and resident of Colfax, in the county of Jasper and State of Iowa, have invented a certain new and useful Spread-Roller, of which the following is a specification.

My invention relates to spread rollers for harness lines and the like.

The object of my invention is to provide a spread roller device of comparatively simple, durable and inexpensive construction, having a frame and a pair of rollers mounted therein, one of said rollers being removable for inserting a line between the rollers.

A further object is to provide such a device having means for locking the frame in position for holding the rollers, and having a portion adapted when the frame is so locked to receive and serve as a guide for a spreading strap.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a front elevation of a hame showing the spread strap and the spread roller thereon. Fig. 2 shows a side elevation of the spread roller. Fig. 3 shows a sectional view of the spread roller taken on the line 3—3 of Fig. 2. Fig. 4 shows a top or plan view of the spread roller, and Fig. 5 shows a front elevation of the lock device.

In the illustration of my invention shown in the accompanying drawings, I have used the reference numeral 10 to indicate generally a hame to which is secured a spreader strap 11 in the ordinary way.

My improved spread roller comprises a frame having an end member 12 and parallel side members 13 extending away from the end member 12 at right-angles thereto. Near their free ends, the side members 13 are inclined toward each other at 14. At the outer ends of the inclined portions 14, the ends of the side members 13 extend away from the end member 12 forming parallel portions 15. The free ends of the side members 13 are inclined toward each other, forming portions 16 arranged in alinement with each other and parallel with the end member 12.

The side members 13 are made of suitable resilient material and are provided with two pairs of openings, the openings of each pair being indicated respectively by the numerals 17 and 18. The openings 17 in the opposite side members 13 are alined and the openings 18 are alined with each other.

Mounted between the side members 13, for rotation, is a shaft 19 having spindles 20 rotatably received in the openings 17. The shaft 19 is mounted near the end member 12.

Mounted between the side members 13, between the shaft 19 and the portions 14 of the side members is a shaft 21 smaller than the shaft 19, having at its ends spindles 22 mounted in the openings 18 and having fixed on said spindles retaining washers 23 between the side members 13. Rotatably mounted on the shaft 19 is a roller 24. Rotatably mounted on the shaft 21 is a roller 25 preferably smaller than the roller 24.

For holding the portions 15 against spreading when the rollers have been assembled in their positions, shown on Fig. 3, I provide a retaining or locking device, comprising parallel side members 26 which are connected by parallel end members 27 arranged at right-angles to the members 20, as shown in Fig. 5 and Fig. 3. The retaining device just described, is placed over the end portions 15 with the side members 26 engaging the side edges of the portions 15, and with the end members 27 outside and engaging the members 15 parallel therewith, as shown in Fig. 3.

In the practical assemblying and use of my improved spread roller, the retaining or locking device is removed, and the sides 13 are sprung apart to permit the removal of the roller 25. The retaining washers 23 hold the roller 25 on the shaft 21, when the shaft 21 is not mounted in the frame. The line 28 is then placed between the side members 13 adjacent to the roller 23 and the roller 25 is assembled in position, shown in Fig. 3, with the line 28 received between the rollers 24 and 25. The retaining device is then slipped over the portions 15, as hereinbefore described, and the spreader strap 11 is inserted between the frame portions 15, the end members 26 of the retaining device and the portions 16 of the frame, as shown in Fig. 3. It will be noted that the spreader strap 11, when inserted as just described, serves to prevent the removal of the retaining device, so that the frame is locked in position for holding the rollers 24 and 25 until the spreader strap 11 is removed.

In Fig. 4, I have shown in dotted lines the positions of the side members 13 of the frame when they are sprung apart to permit the removal of the roller 25 and the insertion of the line.

It will be noted that my device is of extremely simple construction, and that the frame may be made of suitable resilient metal, which can be stamped and formed at a minimum of expense.

The device is simple to operate and when once installed on the harness, there is not any danger of the frame being spread for releasing the roller 25, until the spreader strap 11 is removed.

It is my intention to cover by this application any use of mechanical equivalents, or any modified form of structure or arrangement of parts of my device which may be reasonably included within the scope of my claims.

I claim as my invention:

1. In a device of the class described, a frame having opposite spaced resilient side members, an end member integral therewith, a roller rotatably supported between said side members, a second parallel roller rotatably supported between said side members and detachably mounted thereon, and detachable means for locking said side members against spreading.

2. In a device of the class described, a frame having opposite spaced resilient side members, an end member integral therewith, a roller rotatably supported between said side members, a second parallel roller rotatably supported between said side members and detachably mounted thereon, and detachable means for locking said side members against spreading, said means and the ends of said side members being adapted to receive between them a spreader strap, which prevents the removal of said means.

3. A spread roller comprising a frame having an end member, opposite spaced resilient side members, a pair of rollers rotatably supported between said side members in spaced relation, one of said rollers being removable when the side members are spread apart, said side members having free ends inclined toward each other, and then extended away from said end member in parallel relation with each other, and then extended toward each other in alinement with each other and parallel with said end member, and a retaining device comprising opposite spaced side members and connecting end members, said retaining device being adapted to receive the parallel ends of said side members, so that a spreader strap may be inserted between the side of the retaining device, the last described parallel portions of the side members, and the opposite inwardly extending portions of the free ends of said side members, whereby the spreader strap will hold said retaining device against removal from said frame.

FRANK W. LOGSDON.

Copies of this patent may be obtained for five cents each, by addressing the "Commissioner of Patents, Washington, D. C."